April 28, 1959     K. C. CROFT     2,883,785
FISHING LURE
Filed July 2, 1956
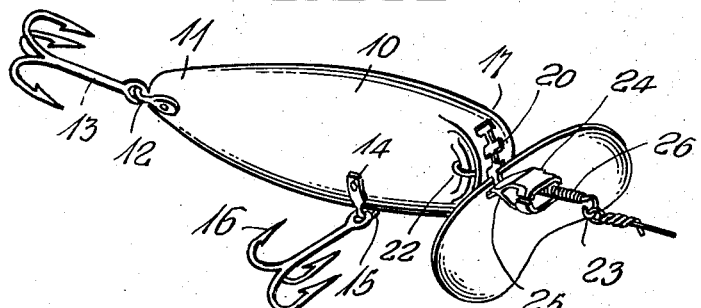
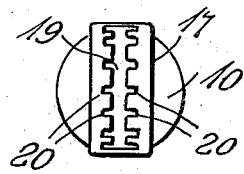
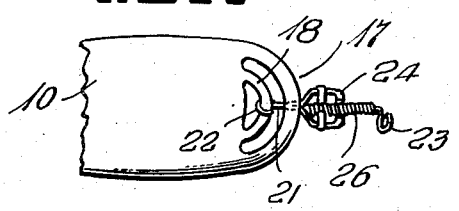
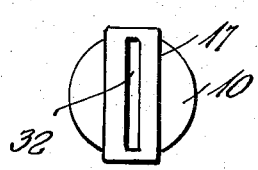
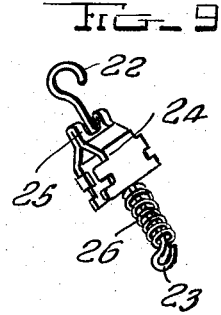
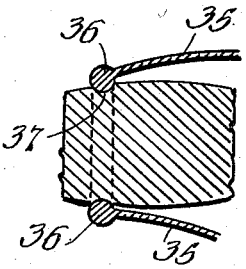
INVENTOR
KENNETH C. CROFT,
BY
ATTORNEY United States Patent Office 2,883,785
Patented Apr. 28, 1959

2,883,785

FISHING LURE

Kenneth C. Croft, Dayton, Ohio

Application July 2, 1956, Serial No. 595,392

4 Claims. (Cl. 43—42.09)

The present invention relates to a fishing lure and it consists in the combinations, constructions and arrangements of parts herein described and claimed.

Generally there is provided a fishing lure having the conventional streamlined body and provided with tail hooks and belly hooks. The device is further provided with an integrally formed semi-circular forwardly projecting nose piece having a slot therein from which slot extend at either side pairs of opposed notches. There is also provided integrally with the forward portion of the body a semi-circular lock ring likewise formed integrally with the body and positioned concentrically within the nose piece and in spaced relation thereto. A shaft extends through the slot and is provided with a hook for engaging the lock ring at its rearward end and is provided at its forward end with a knob or the like. The shaft extends through a collar and through an apertured rectangular lug formed integrally with such collar and a compression spring surrounds the shaft and bears against the collar at one of its ends and against the knob at the other end. A plurality of differently shaped rotor heads is supplied as a part of the invention and each is provided with novel means whereby the same may be locked upon the lug between the main portion of the collar and the forward portion of the nose. The rectangular lug is adapted to be selectively receivable in the various pairs of notches in the nose so that the different rudders may be placed at selected angles with respect to the body of the lure to thus provide a variety of effects in the completed lure. By reversing the various rudder heads, a still greater variety of effects may be attained.

It is accordingly an object of the invention to provide a novel fish lure having means for mounting rudder heads thereon at preselected angles, with relation to the body of such lure.

Another object of the invention is to provide a device of the character set forth in which the rudder heads are interchangeably mounted thereon.

A further object of the invention is to provide a device of the character set forth which is simple in construction, inexpensive to manufacture and yet effective and efficient in use.

Other and further objects of the invention will become apparent from a reading of the following specification taken in conjunction with the drawing, in which:

Figure 1 is a perspective view of an embodiment of the invention,

Figure 2 is a fragmentary side elevational view thereof,

Figure 3 is a front end elevational view of the device shown in Figures 1 and 2 with certain parts removed therefrom, Figure 4 is a view similar to Figure 3 but showing another form the invention may assume, Figure 5 is a plan view of a rudder head forming a part of the invention, Figure 6 is a view similar to Figure 5 but showing another form of rudder head which may be utilized in the invention, Figure 7 is a perspective view of a still further embodiment of rudder head, Figure 8 is a perspective view similar to Figure 1 but showing another embodiment of the invention, Figure 9 is a perspective view of the adjustable rudder head mounting device shown in Figure 2, and Figure 10 is a fragmentary sectional view taken substantially along line x—x of Figure 8.

Referring more particularly to the drawing, there is shown therein a fishing lure having an elongated streamlined body 10 of conventional structure and provided at one end with a tapering tail portion 11 to which is affixed an eye 12 having, in turn, mounted thereon a multiple hook 13. To the forward under side of the body 10 there is affixed, by means for a bracket 14 and eye 15, a multiple hook 16.

A semi-circular forwardly projecting nose 17 is formed integrally with the forward end of the body 10 and a semi-circular retainer ring 18 is likewise formed integrally with the forward end of the body 10 but in spaced concentric relation to the nose 17. The nose 17 is provided with a longitudinal slot 19 from which projects at either side thereof pairs of opposed notches 20.

A shaft 21 extends through the slot 19 and terminates at its rearward end in a hook 22 which engages the ring 18. For forward end of the shaft 21 terminates in a knob 23.

A collar 24 has integrally formed at its rearward end an apertured rectangular lug 25 and the shaft extends through the collar 24 and its lug 25. A compression spring 26 surrounds the shaft 21 and bears against the collar 24 at one end and against the knob 23 at its other end.

In Figures 5 to 7, inclusive, there are shown three rudder heads 27, 28 and 29. Each of the rudder heads is of a different shape but each is centrally provided with a T-slot 30 or, as in Figure 6, a double T-slot 31.

In the operation of this form of the invention, it will be seen that one of the rudder heads may be positioned upon the collar 24 by inserting the rectangular lug 25 into the T-slot 30 or selectively into either portion of the T-slot 31 in such manner that one face or the other of the rudder head may be presented forwardly. Thereafter the lug 25 may be selectively inserted into any one of the pairs of notches 20 to thus maintain the rudder head at a selected angle with respect to the longitudinal axis of the body 10. The rudder head will be maintained in such position by means of the spring 26 which also acts to maintain the entire device in such position due to the action of the hook 22 upon the locking ring 18.

In the form of the invention illustrated in Figure 4, instead of the slot 19 and the pairs of opposed notches 20, there is provided only a slot 32 which extends longitudinally through the nose 17. In this form of the invention, the position of the particular rudder head 27, 28 or 29 may be quickly and easily adjusted by merely moving the collar 24 to any desired position whereupon it will be maintained in such position by the action of the spring 26 pressing the collar 24 and its lug 25 against the outer face of the nose 17.

A modification of the fishing lure of the invention is illustrated in Figures 8 and 10, and is similarly constructed as described in connection with Figures 1 and 2; however, in this embodiment, a tight fitting, continuous interchangeable type of sheath member or partial covering 35, preferably made of light-weight resilient material, as for example, a rubber material, is adhesively secured to the body member 10'. Sheath member 35 may, if desired, be provided with an inwardly projecting annular bead 36 along the inner circumference thereof, as shown in Figure 10. The body member 10 may also be provided with an annular groove 37, if desired, and bead 36 is constructed to cooperate with groove 37 of the body member 10' to effect a releasable sealing or clinching engagement of the respective members.

Sheath member 35 is preferably provided in color combinations to effect color contrast with respect to body member 10' and is further provided, if desired, with a plurality of flapper members shown generally at 38. Moreover, sheath member 35 may be provided in a variety of color combinations, thus changing the color adaptability of the lure of the invention.

It will thus be seen that there are provided herein devices which may be utilized for a great variety of purposes so that the lure may be quickly and easily converted to a "high-riding" or "low-riding" type of "wabbler," "wiggler," "popper" or the like thus providing in a single device the capabilities of a plurality of conventional lures.

While but two forms of the invention have been shown and described herein, it will be readily apparent to those skilled in the art that many minor modifications may be made without departing from the spirit of the invention or the scope of the appended claims.

What is claimed is:

1. A device of the character described comprising an elongated body having a head and a tail, hooks carried by said tail and said body, a semi-circular nose integrally formed and forwardly extending from said body and having a longitudinal slot formed therein, a semi-circular lock ring affixed to and projecting forwardly from said body in inwardly spaced concentric relation to said nose, a collar having an apertured lug at its rear end, a shaft extending through said slot, collar and lug, a hook at the rear end of said shaft and engaged with said lock ring, a knob at the forward end of said shaft, a compression spring surrounding said shaft and bearing against said collar and said knob, and a rudder head removably mounted on said lug.

2. A device in accordance with claim 1 wherein said slot has communicating therewith a plurality of pairs of opposed notches, and wherein said lug is selectively engageable with said pairs of notches.

3. A device of the character described comprising an elongated body having a head and a tail, hooks attached to said tail and said body, a semi-circular nose integrally formed and forwardly extending from said body and having a longitudinal slot formed therein, said slot having a plurality of oppositely paired notches, a semi-circular lock ring affixed to and projecting forwardly from said body in inwardly spaced concentric relation to said nose, a spring-shaft extending through said slot, a retaining member at the rear end of said spring-shaft and engaged with said lock ring, a knob at the forward end of said spring-shaft, a lug intermediate said knob and said slot on said spring-shaft, and a rubber head removably mounted on said lug and engageable with said pairs of notches at selected angles with respect to the longitudinal axis of said body.

4. A device in accordance with claim 3 wherein said body has releasably secured thereto a sheath provided with a flapper member.

References Cited in the file of this patent
UNITED STATES PATENTS

| | | |
|---|---|---|
| 1,232,211 | Burkman | July 3, 1917 |
| 2,027,069 | Sorenson | Jan. 7, 1936 |
| 2,494,384 | Gadzinski et al. | Jan. 10, 1950 |
| 2,578,786 | Davis | Dec. 18, 1951 |